INVENTOR
BASIL CHARLES TANNER
BY
Morgan, Finnegan, Durham & Pine
ATTORNEY

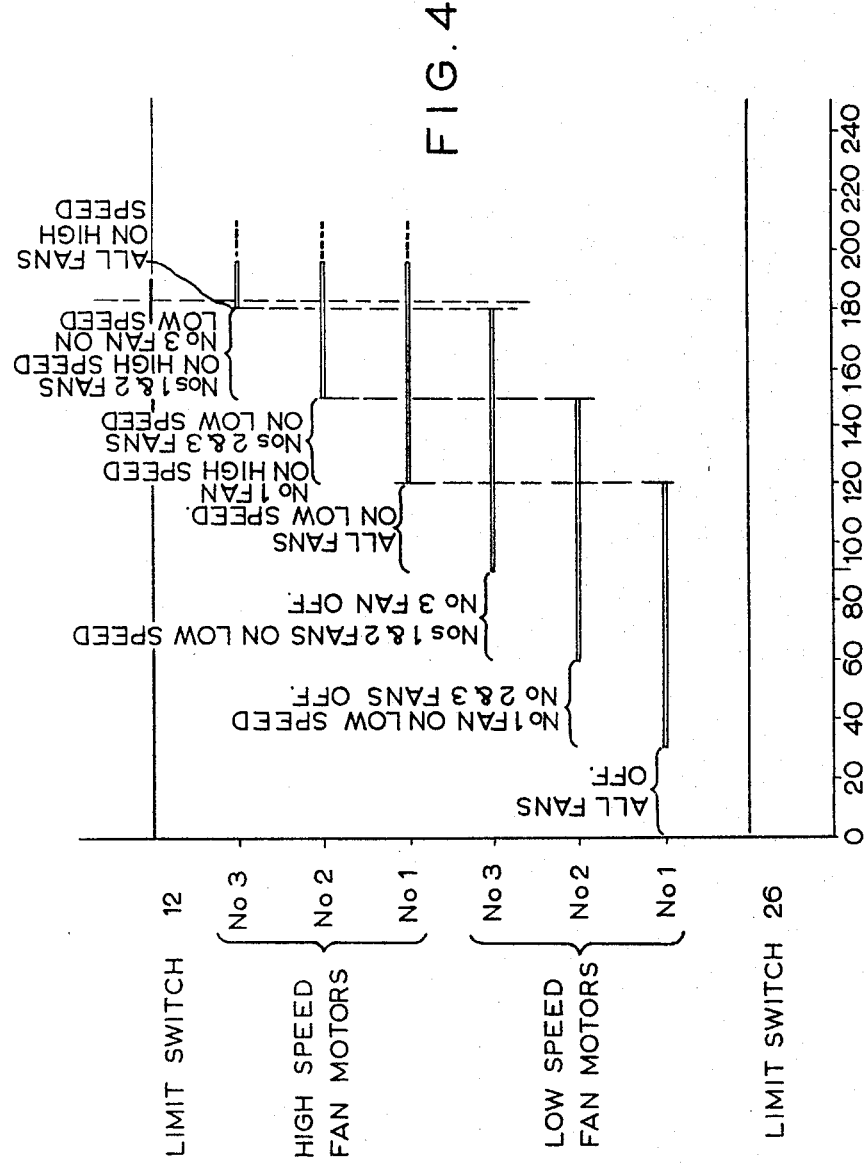

United States Patent Office 3,332,621
Patented July 25, 1967

3,332,621
AUTOMATIC CONTROL MEANS
Basil Charles Tanner, London, England, assignor to Head Wrightson & Company Limited, London, England, a company of Great Britain
Filed Sept. 15, 1964, Ser. No. 396,578
Claims priority, application Great Britain, Oct. 10, 1963, 39,926/63
10 Claims. (Cl. 236—46)

The invention relates to automatic control means and particularly to the automatic control of fans for temperature regulation.

The invention has among its objects to provide means whereby the temperature of a cooling fluid flow is maintained between predetermined limits.

According to the invention temperature regulating means comprises thermostats effective, upon temperature changes, to move contacts to connect cam and timer means to a power supply whereby energisation, de-energisation or a speed change of one or more motor driven fans or the equivalent is effected.

According to the invention furthermore, the temperature regulation is carried out in a series of steps, the steps being spaced apart by determined time intervals so as to allow the temperature to stabilise.

According to the invention moreover two thermostats may be provided, one for increasing the quantity of air flow caused by the fans and one for decreasing the quantity of air flow caused by the fans.

According to the invention further, the cam means may be motor driven and the driving motor de-energised as soon as a timer is started, the timer means being de-energised after a predetermined time period, the cam driving motor being then re-energised if the exhaust of the fluid cooled by the fans is still outside predetermined limits.

The invention is diagrammatically illustrated by way of example in the accompanying drawings in which:

FIGURE 4 is a diagram illustrating the relationship between the cam switch operations and the position of the cam shaft.

Figure 1:
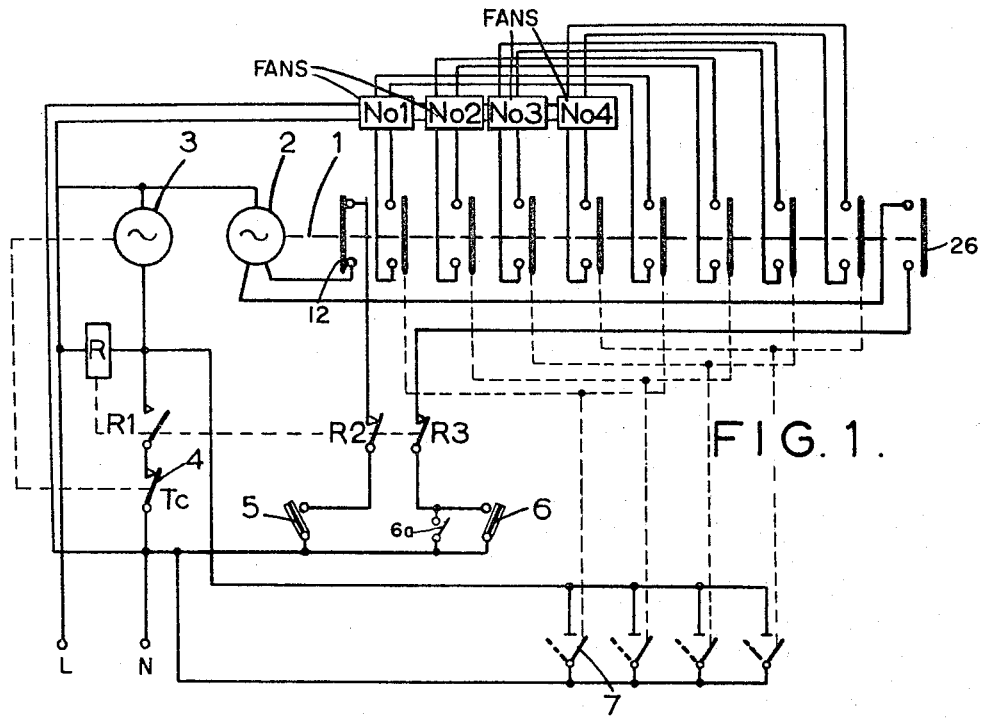
FIGURE 1 shows the basic circuit of the temperature regulating means of the invention.

Referring to FIGURE 1 a cam controller 1, driven by a motor 2, controls the power supply to four two-speed fan motors. A timer and motor 3 control the position of a contact 4. Relay R controls contacts $R_{1-3}$. Thermostats 5 and 6 close when the exhaust fluid from the system being cooled is too hot or too cold respectively having regard to the desired temperature of exhaust fluid.

In operation a single phase supply is applied to terminals N and L.

Assuming that all the fan motors are stationary and that the contact 5 is closed by the over-hot fluid. Contact $R_2$ is already closed, so that power is supplied through the closed forward limit switch 12 of the cam controller 1, to the motor 2.

The motor 2 rotates the cam controller 1 which closes the low speed contact on the first motor which then starts to run. Contact 7 is a wipe contact which supplies a momentary pulse to the timer 3. When the low speed contact closes, the dotted lines show the position when the contactor is closed. This pulse also energises relay R closing contact $R_1$ and opening contacts $R_2$ and $R_3$. The motor 2 is thus de-energised and the cam controller 1 stops, but the timer 3 is energised through contact Tc which was closed by the energisation of timer 3. A delay period, governed by the setting of the timer, then ensues to allow the temperature of the exhaust to stabilise under the cooling action of the fan. At the end of the delay period the timer trips out, opening contact Tc and de-energising itself and the relay R. Contacts $R_2$ and $R_3$ then close and if contact 5 is still closed the cycle is repeated energising the second of the motors to run at low speed. This cycle is repeated at the intervals set by the timer until either contact 5 opens or all the motors are energised to run at high speed and the reverse limit switch 26 is closed and the forward limit switch 12 is opened thus de-energising the motor 2. An alarm is advantageously provided which operates if all the motors are running at high speed and contact 5 still remains closed, thus indicating that either the cooling equipment or the circuitry contains a fault.

The low speed and high speed contactors of each motor are ganged together so that the closing of one automatically opens the other. As the wipe contacts are provided to operate both on opening and on closing of the contactor no wipe contacts are necessary for the high speed contactors. In practice the wipe contacts can be operated by the fan motor starters instead of the cam shaft.

In the reverse operation to that described above, that is to say when the low thermostat contact 6 closes indicating an excessively cool exhaust fluid flow and the cam controller starts to switch motors from high speed down to low speed a time lag is provided so that the motor can run down from high speed, after the contactor is opened, to within a few r.p.m. of low speed before the low speed contactor is closed, mechanical shocks to shafts, gears and couplings are thus avoided.

So long as the contact 6 remains closed at the end of each timer period the cam controller 2 will rotate in the reverse direction until all the motors have been cut down to low speed and then until each motor is cut off completely and the reverse limit switch 26 opened. The forward limit switch 12 has already by then been reclosed and the equipment is thus ready for operation upon a temperature rise.

One suitable thermostat is the "Satchwell" type WT with 18″ steps and a range of 40° F. to 170° F. with a 3° fixed differential, these thermostats are of robust construction and are well proven.

The "Rodene" multi-circuit camshaft timer is particularly suited for use in the invention as a cam controller and the "Rodene 7500" series timer is suitable for setting the time delay between steps as it is adjustable for periods between 1 and 72 minutes. This timer takes 10 seconds to reset from its maximum time period and the camshaft speed should therefore be set such as to give 15 seconds between switch operations, this ensures that the timer has reset and is ready for a further operation.

Figure 2:
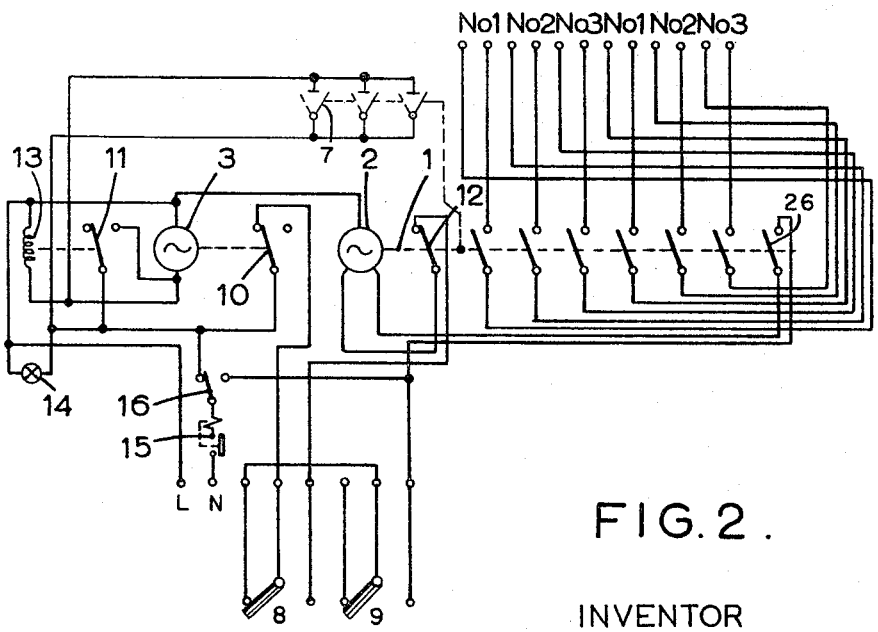
FIGURES 2 and 3 show the circuit in greater detail and including minor modifications.

FIGURE 2 shows a modification of the control circuit of FIGURE 1.

The switches 8 and 9 correspond to the switches 5 and 6 of FIGURE 1 but are series connected so that the switch 9, for example, cannot cause reverse rotation of the camshaft controller unless the switch 8 has its contact in the opposite position to that necessary to cause forward rotation of the cam shaft. Shut down due to the thermostat malfunction is thus avoided. Contact 10 replaces contacts $R_2$ and $R_3$ in that it is opened by the energisation of the camshaft controller whilst the timer motor is running for the delay period. Contact 11 replaces contact 4 and is closed by the wipe contacts 7 of the low speed contactors thus supplying power to the timer motor 3.

In operation if the normally open contact of switch 8 closes indicating excess heat the motor 2 is connected to the power supply by way of switch 12 and rotates the cam controller 1 to close the low speed contactor of the first motor. Wipe contact 7 energises coil 13 closing contact 11, starting motor 3 and opening contact 10. The cam controller is stopped and light 14 being illuminated shows that the equipment is an automatic control. When the timer motor 3 trips out at the end of its period, conacs 10 and 11 close and open respectively and if the normally open contact of switch 8 is still in the closed position the cycle is repeated.

An automatic overcurrent spring circuit breaker 15 is provided and a switch 16 is provided for shut down at the end of a working day in a manner already described.

Figure 3:
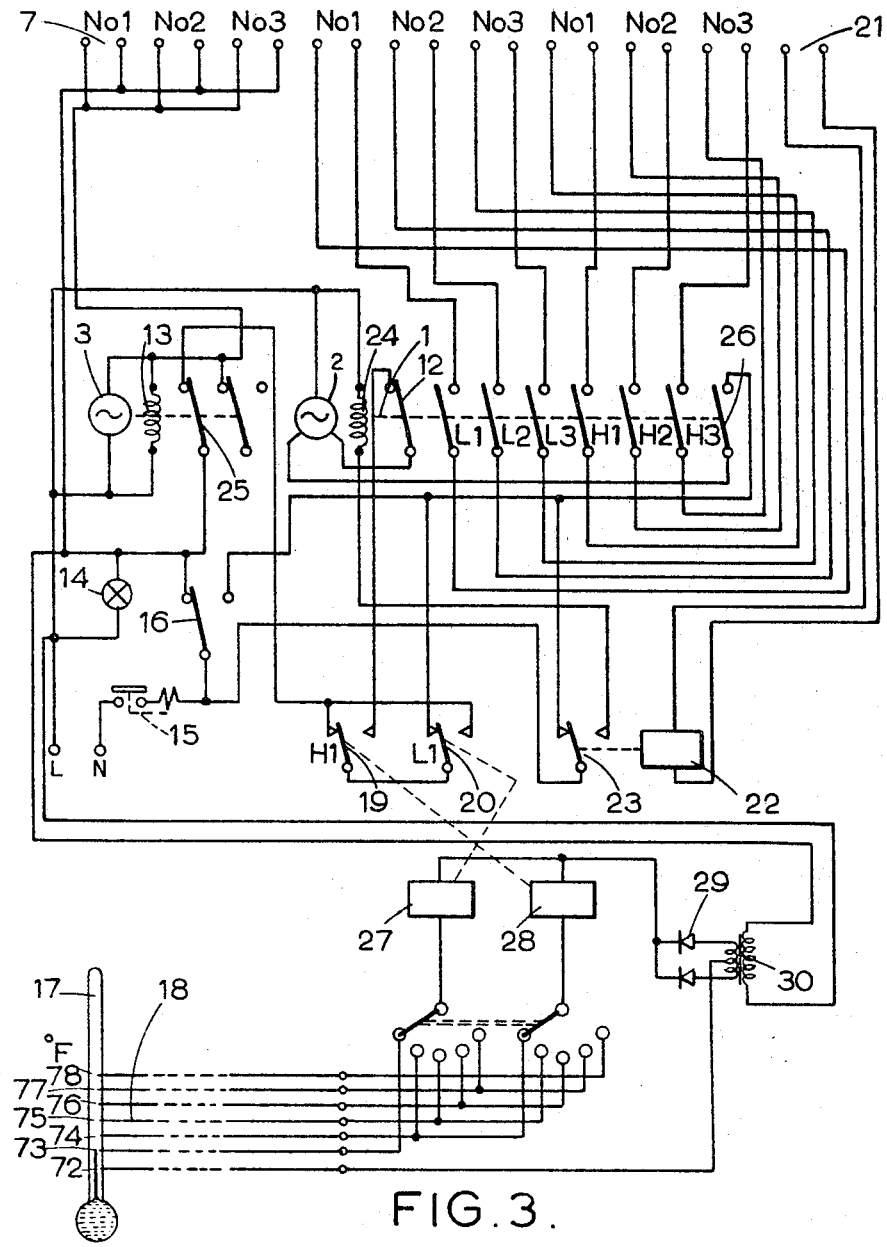

FIGURE 3 shows a further embodiment of the invention.

The form of temperature sensing shown is a mercury in glass thermometer 17 with probes 18, controlling, by way of relays 27 and 28, two thermostat contacts 19 and 20 which correspond to the previous contacts 5, 6, 8 and 9.

The layout shown in FIGURE 3 includes a pair of mains failure contacts 21, which connect with a relay 22, whereby a contact 23 is held in the operative position so long as there is power on the fan motor bus-bars. If the fan motor bus-bar supply fails during operation, but the single phase supply to the circuit is maintained, relay 22 moves to the position shown on the drawing thus cutting off the supply to clutch 24 and the cam controller 1 rotates to the off position in less than one second. This is to ensure that all the motors do not try to start together as soon as the bus bar supply is restored.

In operation contact 20 is usually in the other position to that shown and contact 19 is as shown. If the exhaust is too hot contact 19 moves to the right hand position, and contact 20 is in the right hand position, and therefore motor 2 is fed by way of breaker 15, contact 16, contact 25, contact 20, contact 19 and contact 12. Motor 2 rotates closing the low speed switch on the first motor and wipe contact 7. Wipe contact 7 energises relay 13 which switches contact 25 to the other position to that shown and starts the timer. Contact 25 also de-energises motor 2 but acts as a holding contact to the wipe contact 7 as it maintains the supply to the timer and to the clutch 13. Clutch 24 remains energised. Immediately before the low speed contact on the first motor closes, contact 26 closes in readiness for the return rotation when necessary. As before the delay period ensues whilst the timer is running, then the timer trips out and if contact 19 is still in the right hand position the cycle starts again.

The temperature sensing means 17 and 18 can be used to provide a permissible temperature band only one degree wide. The lower probe 72 shown is used as a common reference and movement of the mercury column due to a temperature extreme connects up the probes determining the boundaries of the temperature band and closes relays 27 and 28 to cause a circulating current through one of the rectifiers 29 and the transformer 30.

Energisation of relays 27 and 28 moves the contacts 19 and 20 respectively to the right hand position as shown. Thus at the desired temperature relay 27 is energised and relay 28 is not, contact 20 is in the opposite position to that shown and contact 19 is as shown. If the exhaust is too cool the contacts are in the position shown. If it is too hot both contacts 19 and 20 are in the opposite position to that shown.

Switch 16 in its normal position energises the circuits for normal sequential temperature control of the fan motor whereas in its alternate position switch 16 connects one side of the power line to motor 2 via contacts 26 to return the cams to their original positions.

The construction according to the invention is particularly suitable for the temperature control of water used as the heat transfer medium in a power generation cycle.

The water is fed through heating means and converted into steam. The steam drives a turbine and is then condensed and fed to cooling towers cooled by the fans controlled by the apparatus of the invention. The water passing downwardly from spray nozzles against a cooling air stream drawn upwardly by the fans. The water falls into a reservoir pond from which it is drawn into the heating means again. The thermostat contacts 5 and 6, 8 and 9, 17 and 18 or 19 and 20 are advantageously provided either between the condenser and the cooling towers, or between the pond the heating means. The latter position allows for variations caused by atmospheric conditions and ensures a constant temperature of feed to the heating means at all times.

The construction according to the invention is also applicable to the cooling systems of nuclear reactors, particularly the cooling systems of small experimental reactors.

FIGURE 4 is a graph showing the energisation of the fans and limit switches at different angular displacements of the cam shaft from a zero position.

I claim:

1. Temperature regulating means comprising, in combination, at least one fan, a motor for driving each fan, a timer, at least one cam, electrical contacts operable by said cam effective to alter the power supplied to said motor from a power source, a cam driving motor and at least one thermostat effective, upon temperature change of a medium acted upon by said fan, to energise said cam driving motor, to rotate said cam, operate said electrical contacts, and effect a speed change of said motor, said timer being coupled to said electrical contacts so that operation of said electrical contacts being effective to energise said timer and de-energise said cam driving motor for a predetermined period of time.

2. Temperature regulating means as defined in claim 1, wherein the temperature regulation is carried out in steps, the period between said steps being preset on said timer, said timer being connected to de-energise itself at the end of the preset time period and being connected to re-energise said cam driving motor if said medium is still outside predetermined temperature limits.

3. Temperature regulating means as defined in claim 2, wherein two thermostats are provided, a first thermostat being effective, by means of said cam driving motor, said cam and said electrical contacts to raise the speed of said motor and a second thermostat being effective by means of said cam driving motor, said cam and said electrical contacts to reduce the speed of said motor, and in which an upper of said predetermined temperature limits can be set on said first thermostat and in which a lower of said predetermined temperature limits can be set on said second thermostat.

4. Temperature regulating means as defined in claim 1, wherein operation of said electrical contacts is effective to energise said timer and de-energise said cam driving motor by means of wipe contacts mounted on said electrical contacts.

5. Temperature regulating means as defined in claim 3, in which said cam driving motor can be supplied with power from a power source through an electrical contact on one of said first and second thermostats, the contacts on both said first and second thermostats being open when said medium is between said predetermined temperature limits.

6. Temperature regulating means comprising, in combination, at least one fan, a motor for driving each fan, a timer, at least one cam, electrical contacts operable by said cam effective to alter the power supplied to said motor from a power source, a cam driving motor and at least one thermostat, effective, upon temperature change of a medium acted upon by said fans, to energise said cam driving motor, to rotate said cam, operate said electrical contacts, and operate switch means by which switch means said motor is connectable to said power source, operation of said electrical contacts being effective to energise said timer and de-energise said cam driving motor.

7. Temperature regulating means as defined in claim 6, wherein the temperature regulation is carried out in steps, the period between said steps being preset on said timer, said timer being connected to de-energise itself at the end of the preset time period and being connected to re-energise said cam driving motor if said medium is still outside predetermined termperature limits.

8. Temperature regulating means as defined in claim 7, wherein two thermostats are provided, a first thermostat being effective, by means of said cam driving motor, said cam and said electrical contacts to connect said motor to said power source, and a second thermostat being effective by means of said cam driving motor, said cam and said electrical contacts to disconnect said motor from said power source, and in which an upper of said predetermined temperature limits can be set on said first thermostat and in which a lower of said predetermined temperature limits can be set on said second thermostat.

9. Temperature regulating means as defined in claim 6, wherein operation of said electrical contacts is effective to energise said timer and deenergise said cam driving motor by means of wipe contacts mounted on said electrical contacts.

10. Temperature regulating means as defined in claim 8, in which said cam driving motor can be supplied with power from a power source through an electrical contact on one of said first and second thermostats, the contacts on both said first and second thermostats being open when said medium is between said predetermined temperature limits.

References Cited

UNITED STATES PATENTS

| | | | |
|---|---|---|---|
| 1,925,822 | 9/1933 | Shurtleff | 237—12 |
| 1,952,299 | 3/1934 | Van Valkenburg. | |
| 2,038,578 | 4/1936 | Lamb | 236—11 X |
| 2,458,683 | 1/1949 | Cowherd et al. | 103—25 |

WILLIAM J. WYE, *Primary Examiner.*

ALDEN D. STEWART, *Examiner.*